(12) United States Patent
Nakamichi (10) Patent No.: US 9,185,891 B2
(45) Date of Patent: Nov. 17, 2015

(54) INSTANT RESPONSE PROTECTIVE SINKER AND HOOK COMBINATION

(75) Inventor: Shigeyuki Nakamichi, Nishiwaki (JP)

(73) Assignee: OWNER AMERICAN INC., Costa Mesa, CA (US)

( * ) Notice: Subject to any disclaimer, the term of this patent is extended or adjusted under 35 U.S.C. 154(b) by 573 days.

(21) Appl. No.: 13/292,566

(22) Filed: Nov. 9, 2011

(65) Prior Publication Data

US 2012/0174468 A1    Jul. 12, 2012

(51) Int. Cl.
*A01K 85/00*    (2006.01)
*A01K 85/02*    (2006.01)
*A01K 83/00*    (2006.01)

(52) U.S. Cl.
CPC ............... *A01K 85/02* (2013.01); *A01K 83/00* (2013.01); *A01K 85/00* (2013.01)

(58) Field of Classification Search
CPC .................................. A01K 85/00; A01K 83/00
USPC ............ 43/44.81, 42.39, 42.24, 42.37, 43.16, 43/43.15, 42.1, 43.2, 43.4, 43.6
See application file for complete search history.

(56) References Cited

U.S. PATENT DOCUMENTS

| | | | | |
|---|---|---|---|---|
| 497,962 A | * | 5/1893 | D'Ivernois | A01K 85/00 43/44.81 |
| 588,729 A | * | 8/1897 | Harris | A01K 85/14 43/42.39 |
| 1,073,199 A | * | 9/1913 | Wilt | A01K 85/10 43/42.39 |
| 1,250,473 A | * | 12/1917 | Ladd | 43/44.81 |
| 1,357,678 A | * | 11/1920 | Bain | A01K 83/00 43/44.81 |
| 1,582,171 A | * | 4/1926 | Foss | A01K 85/10 43/42.39 |
| 1,589,522 A | * | 6/1926 | Felix | 43/43.15 |
| 1,593,593 A | * | 7/1926 | Olsen | 43/43.15 |
| 1,727,936 A | * | 9/1929 | Pflueger | A01K 85/16 43/42.39 |
| 1,990,693 A | * | 2/1935 | Hildebrandt | 43/42.37 |
| 2,133,884 A | * | 10/1938 | Barrett | 43/34 |
| 2,543,293 A | * | 2/1951 | Leitch et al. | 43/43.15 |
| 2,589,715 A | * | 3/1952 | Lysikowski | 43/43.14 |
| 2,591,294 A | * | 4/1952 | Ripich | 43/44.81 |
| 2,598,011 A | * | 5/1952 | Pitre | 43/44.81 |
| 2,791,060 A | * | 5/1957 | Kender | 43/43.15 |
| 2,814,151 A | * | 11/1957 | Knapton | 43/43.15 |
| 3,001,319 A | * | 9/1961 | Sonner, Jr. | 43/43.15 |
| 3,011,284 A | * | 12/1961 | Sawyer | 43/43.15 |
| 3,110,979 A | * | 11/1963 | Woodley | 43/42.74 |
| 3,118,245 A | * | 1/1964 | Shriver | 43/43.15 |
| 3,341,966 A | * | 9/1967 | Pippen | 43/43.15 |
| 3,389,490 A | * | 6/1968 | Peters et al. | 43/42.39 |
| 3,449,854 A | * | 6/1969 | Sinclair | 43/43.15 |
| 3,500,576 A | * | 3/1970 | Ostrom | 43/44.81 |
| 3,803,747 A | * | 4/1974 | Cartwright | 43/44.81 |
| 3,858,343 A | * | 1/1975 | Goforth | 43/42.39 |
| 3,965,606 A | * | 6/1976 | Bingler | 43/42.39 |
| 4,161,838 A | * | 7/1979 | Gapen | 43/42.11 |
| 4,166,334 A | * | 9/1979 | Talalaj | 43/43.6 |
| 4,314,420 A | * | 2/1982 | Dickinson et al. | 43/42.39 |
| 4,334,381 A | * | 6/1982 | Carver et al. | 43/44.81 |
| 4,450,646 A | * | 5/1984 | Maltese | 43/44.81 |
| 4,467,550 A | * | 8/1984 | Haulk | 43/43.12 |
| D278,927 S | * | 5/1985 | Uzell | D22/145 |
| 4,727,676 A | * | 3/1988 | Runyan | 43/43.1 |
| 4,744,168 A | * | 5/1988 | McClellan | 43/42.24 |

(Continued)

*Primary Examiner* — Darren W Ark (57) ABSTRACT

The present invention is a combined device with a fishing hook with a sinker weight closely coupled to each other but adapted to result in inversion of the fishing hook when the device is allowed to descend though water, thereby protecting against snagging the hook in underwater obstacles.

13 Claims, 11 Drawing Sheets

(56) References Cited

U.S. PATENT DOCUMENTS

| | | | | |
|---|---|---|---|---|
| 4,750,289 A * | 6/1988 | Rossa | | 43/44.96 |
| 4,920,688 A * | 5/1990 | Devereaux et al. | | 43/42.39 |
| 4,926,579 A * | 5/1990 | Jimenez | | 43/43.4 |
| 5,083,394 A * | 1/1992 | Harwig | | 43/43.16 |
| 5,094,026 A * | 3/1992 | Correll et al. | | 43/42.28 |
| 5,203,106 A * | 4/1993 | Huppert | | 43/42.39 |
| 5,220,743 A * | 6/1993 | McClellan | | 43/44.81 |
| 5,335,443 A * | 8/1994 | Grigsby, Jr. | | 43/44.81 |
| 5,832,655 A * | 11/1998 | Crumrine | | 43/42.39 |
| 5,887,380 A * | 3/1999 | Matlock | | 43/42.74 |
| 5,890,317 A * | 4/1999 | Hollomon | | 43/42.37 |
| 5,904,001 A * | 5/1999 | Rabideau | | 43/44.8 |
| 5,950,348 A * | 9/1999 | Gruel | | 43/43.15 |
| 5,953,849 A * | 9/1999 | Boucher, Jr. | | 43/42.39 |
| 6,006,467 A * | 12/1999 | Ulrich | | 43/43.2 |
| 6,073,385 A * | 6/2000 | Sano | | 43/44.83 |
| 6,405,477 B1 * | 6/2002 | Huppert | | 43/42.37 |
| 6,836,996 B1 * | 1/2005 | Huppert | | 43/42.39 |
| 6,895,711 B1 * | 5/2005 | Nakamichi | | 43/42.24 |
| 7,415,793 B1 * | 8/2008 | Borchardt | | 43/42.39 |
| 7,841,127 B1 * | 11/2010 | Nakamichi | | 43/42.24 |
| 7,866,085 B1 * | 1/2011 | Ruzicka | | A01K 85/00 43/43.15 |
| 8,091,271 B2 * | 1/2012 | Mayer | | A01K 85/00 43/42.24 |
| 8,468,738 B1 * | 6/2013 | Long | | 43/43.16 |
| D697,165 S * | 1/2014 | Lorentz | | D22/144 |
| 8,733,012 B2 * | 5/2014 | Thorne | | 43/42.24 |
| 2004/0261312 A1 * | 12/2004 | Ravencroft | | 43/44.83 |
| 2005/0132634 A1 * | 6/2005 | Reed | | 43/44.81 |
| 2006/0265937 A1 * | 11/2006 | Randall | | 43/42.39 |
| 2007/0107296 A1 * | 5/2007 | Hollomon | | 43/42.37 |
| 2009/0077859 A1 * | 3/2009 | Aylsworth | | 43/42.39 |
| 2009/0211145 A1 * | 8/2009 | Thorne | | 43/42.39 |
| 2009/0260275 A1 * | 10/2009 | Kemp | | 43/43.15 |
| 2010/0083560 A1 * | 4/2010 | Blackshear, Jr. | | 43/43.15 |
| 2011/0271581 A1 * | 11/2011 | Huppert | | 43/43.15 |
| 2012/0204472 A1 * | 8/2012 | Roberts et al. | | 43/42.39 |
| 2012/0216442 A1 * | 8/2012 | Merritt | | 43/42.1 |
| 2012/0216443 A1 * | 8/2012 | Merritt | | 43/44.81 |
| 2013/0019517 A1 * | 1/2013 | Lorentz | | 43/44.81 |
| 2013/0097915 A1 * | 4/2013 | Tamburro | | 43/43.16 |
| 2013/0247443 A1 * | 9/2013 | Stokes | | 43/42.1 |
| 2013/0318859 A1 * | 12/2013 | Kusmerz et al. | | 43/44.81 |
| 2014/0059916 A1 * | 3/2014 | Culver et al. | | 43/42.1 |
| 2014/0259867 A1 * | 9/2014 | Scholfield | | A01K 85/01 43/42.37 |
| 2014/0259869 A1 * | 9/2014 | Scholfield | | A01K 85/00 43/42.39 |
| 2015/0208624 A1 * | 7/2015 | Krohn | | A01K 85/00 43/43.16 |

\* cited by examiner

INSTANT RESPONSE PROTECTIVE SINKER AND HOOK COMBINATION

FIELD OF THE INVENTION

The present invention relates to features of a fishing hook closely combined and coupled with a sinker weight.

BACKGROUND OF THE INVENTION

The prior art describes that a soft plastic or elastomeric shape may be used as a lure when securely attached to a fishing hook. These soft plastic or elastomeric shapes have come to be known as "soft baits", partly because they may be compressed, stretched, and even broken in two with the force supplied by a user's hands. Soft baits are often colored and made into shapes similar to live baits used by fishermen. A popular and highly effective soft bait is one formed like a relatively long worm such as a night crawler. Other well known shapes of soft baits include a crawfish, insects, salamanders, small to mid size fish, as well as shapes that have no known analog to a live bait. It has been speculated that soft baits do not act like their live bait analogs when being drawn through the water to attract game fish. However, soft baits as they are drawn through the water do in fact attract game fish very well, even when many other baits and lures do not work at all.

Soft baits usually consist of a single soft and elastomeric material or polymer, typically a plastisol polyvinyl chloride. The soft and pliable nature of soft baits make them easy to lose or come loose in typical fishing situations. Carolina and Texas "riggin" or rigging are forms of setting a fishing hook in a soft bait. Generally, the object of these forms of rigging is to connect the soft bait to specific locations on the hook to maximize security (the tendency to stay connected to a hook) and obstacle shielding (avoiding hooking underwater weeds and branches). It is well known to introduce a fishing hook point in a soft bait and draw the hook through the soft bait until a part of the soft bait is located covering or near the hook's fishing line connector. Another part of the soft bait is simultaneously or later drawn onto the hook point to shield it from underwater weeds or branches.

The prior art also describes the use of live baits such as small fish, insects, and crustaceans arranged and presented on a fishing hook in a manner similar to that for soft baits. This is not surprising, as the range of soft baits includes forms intended to mimic live baits. A third category of temporary baits intended for securing to a fishing hook for use as baits are the structured soft baits such as fish eggs or pelletized mixtures intended to attract fish and the malleable baits such as Powerbait®, cheese and similar dough-like products.

The attraction to temporary baits such as soft baits, live baits and malleable baits is their effectiveness. The texture of the materials is similar to that which a fish will have experienced in consuming its regular diet items. Sport fish often sample or nibble at a bait or lure before attempting to swallow it. The clear problem with soft baits is that they are easily lost through one or more false strikes by fish.

A fish by way of combined visual, nibble texture, and scent impressions has a vague impression that an object presented to it is something edible and responds to that overall impression. A visual component of the overall impression is well known to be a combined shape and movement of a potential food object in the water whose actions are within the range which the fish has become conditioned to expect such food objects. Water temperature, depth, turbidity, and currents are among the considerations for a fish approaching a food object. Rigid lures and baits are more difficult to present in those conditions as appearing to be the food object expected by a fish. At the same time, current strength and carried materials can negatively affect the presentation of a temporary bait. It is known that the motion of a lure through an area of water where food objects are to be expected by the fish, whether rigid or having a temporary bait, may be more important to attracting the fish than the shape of the lure itself.

Perhaps even more important to the maintenance of a temporary bait in a manner desired by the user are underwater obstacles fixed to the ground and which project upward from it. Those underwater obstacles are the best environment for most fish, providing cover from which to hide from its own predators but also to find smaller food creatures attempting to hide from the fish.

Therein lies a problem for which the prior art contains many attempted solutions. A hook must be used to catch a fish but can also as easily hook many underwater obstacles. Substantially engaging an underwater obstacle, if the engagement does not remove a temporary bait from the hook, can impair its presentation and movement through the water sufficiently to require its replacement. Fishing includes the expectation that many temporary baits may have to be lost to underwater obstacles to catch a single fish. Snag avoidance in the face of mounting loss of temporary baits and hooks will cause the fisherman to change from a desired area to a less desirable one with fewer underwater obstacles. Underwater obstacles comprise weeds, rocks, branches, and other underwater objects.

In a prior art arrangement intended to reduce loss of long, soft baits, the Texas rig uses a bullet shaped sinker located on the fishing line above the eye of the hook to which the line is tied. The hook's point is inserted in the top of the soft bait and then allow to exit some small distance further down. The top of the soft bait is moved up the hook shank until it covers the hook eyelet and knot. The exposed point of the hook is then reinserted into the soft bait at a point further down the body without being allowed to protrude. The rig provides some degree of resistance to snagging since the barbed point of the hook is not exposed and generally would not become hung up on any underwater objects. In this rig, the weight can slide back and forth freely. U.S. Pat. No. 5,832,655 discloses a fishing hook which uses an intervening bullet shaped sinker weight between the eye of the hook and the fishing line. The sinker weight is adapted to fit snugly over the top end of a soft bait worm and so to avoid abrasion and water flow which would tend to dislodge the leading end of a soft bait having a similar top end. When fishing line tension is released underwater, the bullet shaped sinker weight draws the front end of the weight downward with the effective connection to the fishing line. A user pulling on the fishing line must effectively draw upward a longer rigid structure than the hook alone. The overall structure includes the snug fitting sinker weight. In a dense area of underwater obstacles, the additional rigid structure length will cause the structure to encounter more obstacles.

U.S. Pat. No. 3,965,606, similar to the '655 patent, discloses a sinker weight at the terminal end of an overall structure lengthened by the sinker weight and a flexible intervening section. For the same reason that the extended overall length will encounter more underwater obstacles than the hook alone, the device of the '606 patent will fail its snag avoidance purpose as will that of the '655 patent.

U.S. Pat. No. 7,415,793 also suffers from the lengthened overall structure of the combined hook and sinker weight in substantially the same way as that of the '655 and '606 patents. This extended length is antithetical to the requirements of compactness required in dense areas of weeds, reeds or woody stems where fish feel safest and tend to find much prey. The device of the '793 patent teaches away from compactness of a device the size of the hook alone in areas of dense underwater obstacles. A prior art hook and sinker weight combination is widely used where a sinker weight has two generally opposite wire connector loops, one for connecting to the eye of a fishing hook and one to the end of the fishing line. This combination also results in the undesirable lengthened overall structure of the '793 patent.

U.S. Pat. No. 4,744,168 provides a sinker weight in the shape of a prey head but simply reproducing the well known Texas rig described above. The teaching of the above hooks with sinker weight combinations are to extend the overall effective forward drawn length of the combination.

US Patent Publication 2004/0261312 A1 describes the well-known bottom finding rig or Pilchard rig, where a fishing line directly connected to a single hook's eye with no intervening structure to the line to be pulled by a user. A sinker weight is attached to a long connector line and to the hook's eye. In this way, the hook can be brought near to but not down to the ground level. It is intended to avoid bringing the hook into the densest zone of underwater obstacles at the bottom of the body of water, instead allowing the hook to be maintained and a measured level above the dense underwater obstacles. This bottom finding rig is not intended, as are the hook and sinker weight combinations with lengthened overall structures, to be drawn through the densest or bottom zones of underwater obstacles. Clearly, the bottom finding rig doubles the chance that the entire assembly or a hook at the end of one line and the weight at the end of the other line will encounter an underwater obstacle where one of those will be snagged, resulting in a loss of the hook, bait, and sinker weight. One skilled in the art will look to the bottom finding rig as a way to stay out of a dense zone of underwater obstacles, not to enter one voluntarily.

There is a need for a fishing hook and sinker weight combination which eliminates the lengthened structure of the prior art for use in the densest zones of underwater obstacles.

SUMMARY OF THE INVENTION

The present invention is a fishing hook, optionally a dual or treble hook, having a hook eye at a top end and continuously and rigidly extending down to a shank, an upward bend, and a barbed (or unbarbed) point, where a first ring connector is rotatably engaged with both the hook eye and a second ring connector. The second ring connector connects rotatably with a sinker weight connector, which connects a sinker weight to the second ring connector. Pulled downward by gravity from the first ring connector, the second ring connector, sinker weight connector and sinker weight define a weight longitudinal length. Pulled downward by gravity from the first ring connector, the fishing hook defines a hook longitudinal length. In the invention device, the weight longitudinal length is substantially shorter than that shown in the prior art for a bottom finding rig. In the invention device, the sinker weight is close coupled in action to that of the fishing hook, as both are joined to the first connector ring, which is connected to a fishing line directly continuing to the a user capable of directly pulling the first ring connector. Upon said direct pulling action by a user, there is an instant reaction whereby the centers of gravity of the sinker weight and the fishing hook (with or without bait) are drawn to a fishing line axis defined by the pulled fishing line. The collapsed overall structure of the adjacent sinker weight and fishing hook create a streamlined cross-section capable of being drawn through the water without substantial interference through dense underwater obstacles. In a preferred embodiment, the weight longitudinal length extends results, in the pulled orientation, in a bottom end of the sinker weight being either close to or extending just past the hook point, thereby protecting the hook point from underwater obstacles while being drawn through the water.

An even more significant function of the invention device occurs when a user relaxes tension on a fishing line fixed to the first ring connector. Upon such release, the sinker weight (which is preferably pendulum shaped in one embodiment) drops immediately downward in the water, with its bottom end acting as a spearhead for the entire device structure. The fishing hook and temporary bait form a structure have an overall downward path buoyant resistance very much greater than that of the sinker weight. The sinker weight in this set of circumstances, with much greater relative density and much reduced drag resistance in downward water travel, travels so much more quickly downward than the combination of the fishing hook and temporary bait, that the fishing hook is flipped in longitudinal length from adjacent to the sinker weight to a position directly pointing upward from the sinker weight. This flipping to directly upward when the sinker weight travels downward is instantly reversed whenever a user pulls on the fishing line connected with the first ring connector.

Thus, a user of the present invention can release line tension on the fishing line, allowing the sinker weight to spearhead down through underwater obstacles, virtually regardless of their density in the water, inverting the fishing hook and temporary bait to an upside down position. In this upside down position, the hook point is essentially in line with the spearheading effect of the sinker weight. This spearhead shielding results in the entire structure, sinker weight, fishing hook, and temporary bait, being quickly and without snags placed in even a dense zone of underwater obstacles.

As opposed to the use of sinker weights in the prior art which extend the effective length of the combination of the sinker weight and the hook and increase the likelihood of snags in a dense zone of underwater obstacles, the present invention uses a sinker weight close coupled with the fishing hook so that both respond simultaneously to tension or tension release of the fishing line. At line tension, the present invention sinker weight and fishing hook fall tightly together and adjacent for smooth flow through the water and underwater obstacles. At line tension release, the present invention sinker weight and fishing hook separate with the sinker weight acting as a spearhead and the fishing hook acting as a protected length of more downward velocity buoyant body.

In actual use, the present invention has been shown to be exceptionally effective in the zones of densest underwater obstacles. Those skilled in the art have expressed amazement at the manner in which the present invention provides snag-resistant insertion into those zones and the ability of a user to move the present invention combination through underwater obstacles.

An object of the present invention is to provide a close coupled sinker weight and hook combination where the addition of a close coupled sinker weight does not add to the effective overall length of the hook.

A further object of the invention is to provide a sinker weight having the capacity to provide obstacle shielding for a close coupled hook which inverts above the sinker weight in a downward path through the water.

DETAILED DESCRIPTION OF THE INVENTION

The invention is now discussed with reference to the figures.

Sizes and dimensions of prior art fishing hooks are shown in the table below. The numerical measurements in the table are measured in millimeters.

| HOOK SIZE | HOOK LENGTH | HOOK BASE TO POINT DISTANCE | HOOK WIDTH |
|---|---|---|---|
| 1/0 | 39.5 | 15.2 | 14.6 |
| 2/0 | 42.8 | 16.4 | 15.8 |
| 3/0 | 45.9 | 18.3 | 17.3 |
| 4/0 | 51.7 | 20.0 | 19.1 |
| 5/0 | 55.2 | 21.6 | 20.8 |
| 6/0 | 61.5 | 23.5 | 22.8 |

As stated above, it is an object of the invention to provide a combination device having a sinker weight and a fishing hook having an effective length from the hook base to the fishing line connection unaffected by the placement of the sinker weight. The above hook lengths are representative of approximate hook lengths for which the present invention may be used.

Figure 1:
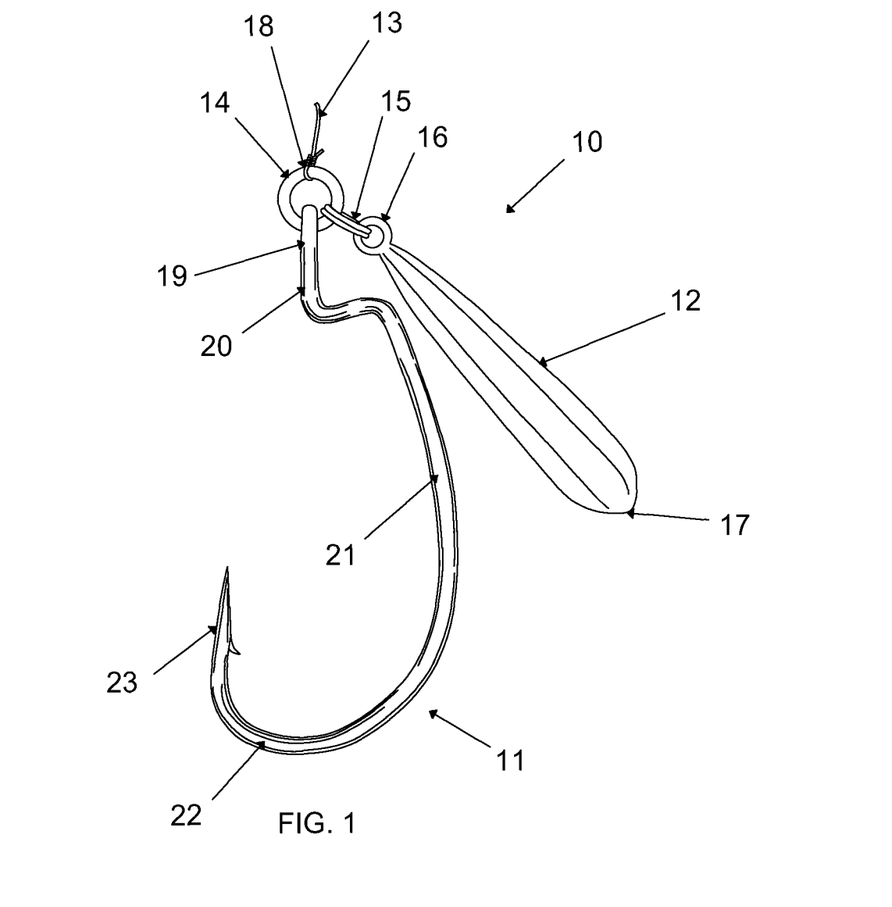
FIG. 1 is a side view of one form of the invention combination device of a sinker weight and a fishing hook with the sinker weight moved aside from its gravity induced position.

FIG. 1 is a side view of one form of the invention combination device 10 of a sinker weight 12 and a fishing hook 11 with the sinker weight 12 moved aside from its gravity induced position. It has been found critical to the invention that weight 12 and hook 11 be joined in the manner described herein, i.e., a first ring connector 14 rotatably joins hook 11 through its hook eye 19 and further rotatably joins second ring connector 15. Second ring connector 15 is preferably a split ring which will enable a user to remove it from engagement with the first ring connector 14. Fishing line 13 is tied at knot 18 to first ring connector 14. Fishing line 13 extends directly to means by which a user instantly applies or relaxes line tension, such as to a fishing pole or other hand held device for effecting such action.

Sinker weight 12 is shown comprising a connector loop 16 extending to a pendulum shaped body with a bottom end 17. Additional links or lines may intervene between loop 16 and second ring connector 15 less preferably than the structure shown in FIG. 1, whereby some of the objects of the invention may be achieved. Fishing hook 11 comprises said hook eye 19, extending to an optional soft bait stay 20, thence to shank 21, bend 22 and upward to hook point 23. Hook 11 and weight 12 are adapted to freely rotate about first connector ring 14 so that the above described flipping between downward path motion and line pulled motion are accomplished.

Figure 2:
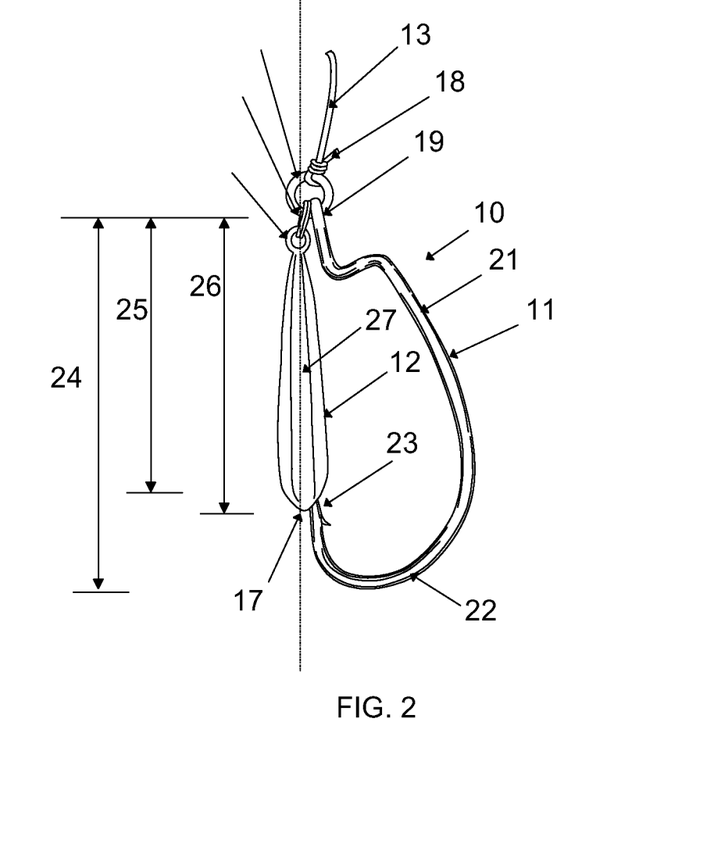
FIG. 2 is an alternate embodiment of the combination device of FIG. 1 with the sinker weight allowed to move to its gravity induced position.

FIG. 2 is an alternate embodiment of the combination device 10 of FIG. 1 with the sinker weight 12 allowed to move to its gravity induced position so that its center of gravity lies adjacent to a gravity line 27 with a center of gravity of the hook 11. This is also the orientation of the hook 11 and weight 12 when a user establishes significant line tension on fishing line 13, where line 27 is a pulling direction axis of fishing line 13, as will be described below. When a temporary bait is fixed to hook 11, the entire assembly of the hook 11 and temporary bait will form a body whose center of gravity moves to the locations described above for the hook 11 alone where gravity alone affects the combination device 10 without motion. When device 10 is in downward motion in the water or in motion in a pulled direction of the fishing line 13, velocity of device 10 through the water will induce a drag and buoyancy effect which slightly alters the location of a center of gravity of the assembly of the hook 11 and temporary bait from that described for the hook 11 alone. That slight alteration has not been found to significantly affect the function of device 10 to achieve the objects of the invention. When fishing line 13 is tied to connector 14, a portion of connector 14 is directed left to the hook side of hook 11 and another portion is directed to the opposite side of hook 11.

In FIG. 2, bottom end 17 of weight 12 is shown defining a lower end of an effective length 26 of weight 12 relative to the hook length 24 and a top end to hook point distance 25. Weight 12 shields hook point 23 as it lies adjacent to it when length 26 is greater than distance 25. When device 10 is drawn through the water by fishing line 13, weight 12 is forced adjacent to hook point 23, protecting it from underwater obstacles. This object of the invention will be substantially accomplished with length 26 equal to from about 10 percent to about 110 percent of length 24, and, more preferably, with length 26 equal to from about 30 percent to about 90 percent of length 24, and most preferably, with length 26 equal to from about 50 percent to about 70 percent of length 24. In yet another form of the invention, the ratio of the weight of hook 11 to that of weight 12 is preferably from 1 to 2 to 1 to 10, and, more preferably from 1 to 3 to 1 to 8. In a specific example, fishing hook 13 weighs about one gram and weight 12 weighs about 4 grams. This set of relations between hook 11 and weight 12 are useful across most fishing hooks, as the motion of drawing the hook 11 by way of the hook eye 19 through the water induces hook point 23 to move to a location near an axis of a fishing line pulling hook 11.

Figure 3:
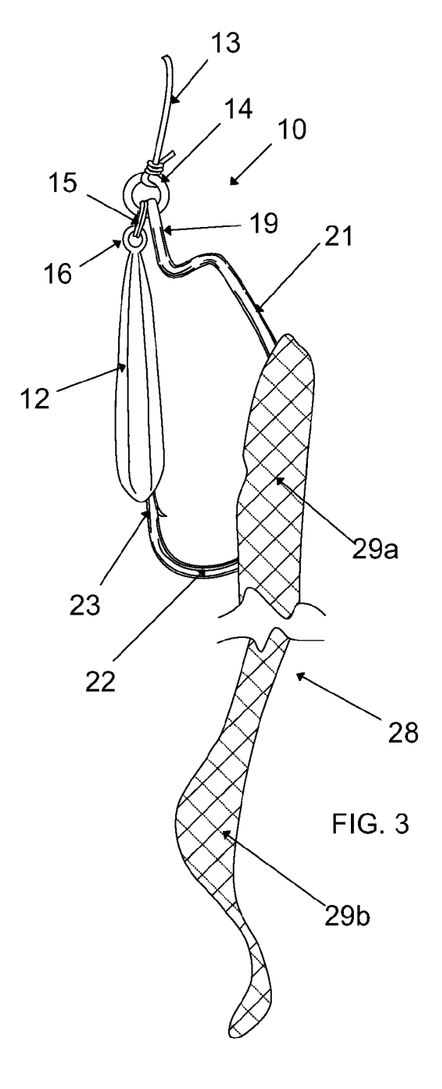
FIGS. 3 and 4 are the combination device of FIG. 2 respectively showing a soft bait and a dough bait fixed to the fishing hook.
Figure 4:
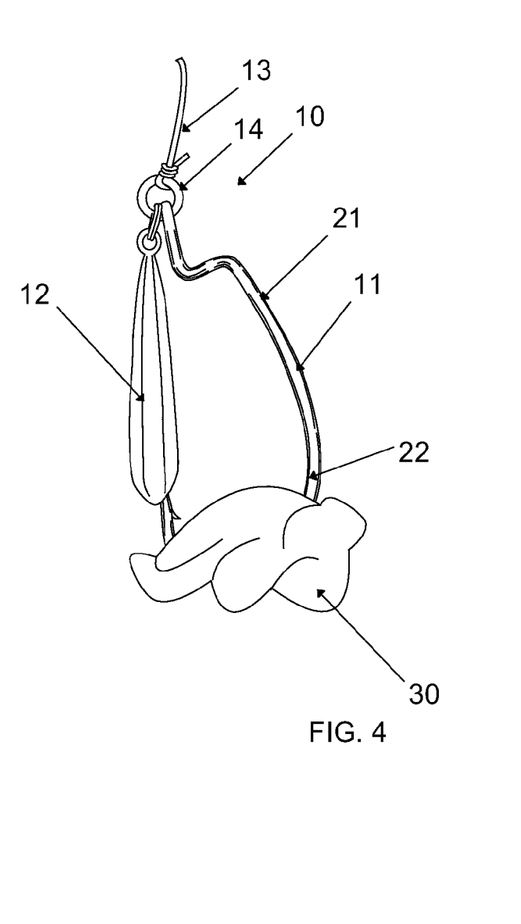

FIGS. 3 and 4 are the combination device 10 of FIG. 2 respectively showing a soft bait 28 and a dough bait 30 fixed to the fishing hook 11. In FIG. 3, bait 28 comprises front section 29a and rear section 29b without the intervening length for convenience, where bait 28 is a soft representation of a worm or fluke attached to shank 21 for the purpose of illustrating effectiveness of the invention device 10 in protecting the hook point 23 from underwater obstacles without the protection of the well known Texas rig or similar rigs.

Figures 5, 6, 7:
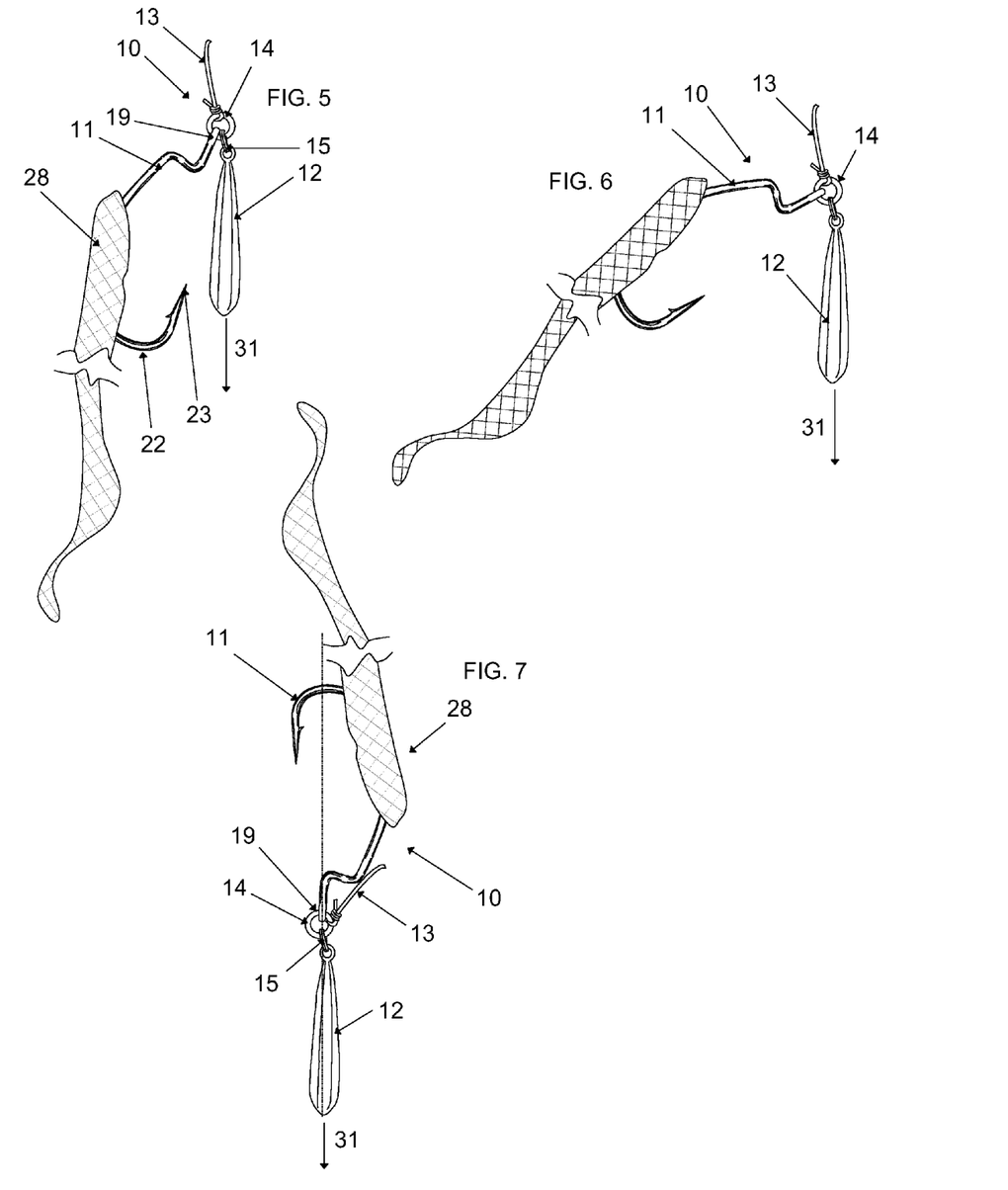
FIGS. 5, 6 and 7 respectively show the combination device of FIG. 2 in initial, mid-acceleration, and effective downward velocity stages after a user releases tension on a fishing line.

FIGS. 5, 6 and 7 respectively show the combination device 10 of FIG. 2 in initial, mid-acceleration, and effective downward velocity stages after a user releases tension on a fishing line 13. FIG. 5 shows that weight 12 starts its spearhead descent along downward path 31 with a low initial velocity, but quickly accelerating as shown in FIG. 6, causing the hook 11 and bait 28 to rotate about first ring connector 14. FIG. 7 shows that, very quickly (within 0.5 to 2.5 seconds in a preferred embodiment) hook 11 and bait 28 move from the positions shown in FIG. 3 to that of FIG. 7 when line tension on fishing line 13 is released and weight 12 spearheads down direction 31, resulting in inversion of hook 11 and bait 28.

Figure 8:
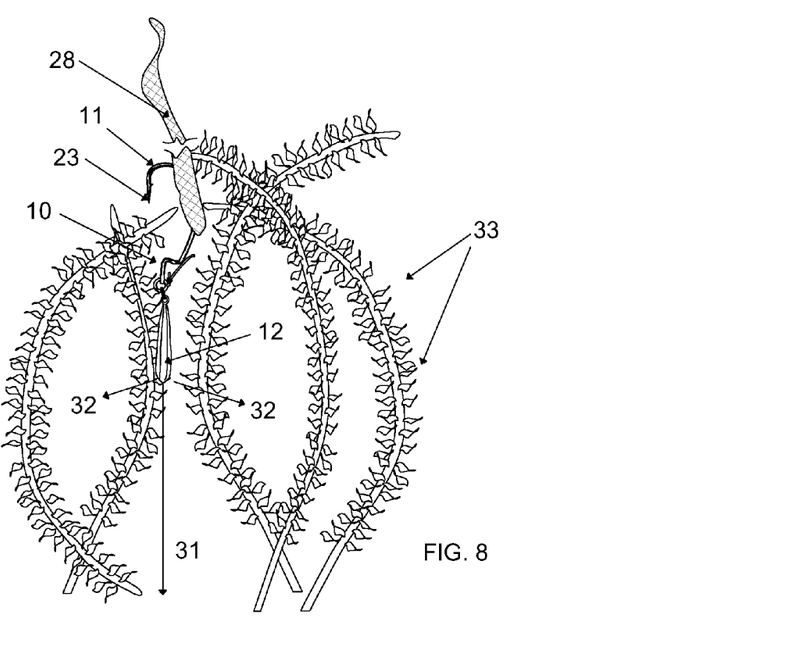
FIG. 8 shows the combination device of FIG. 7 in downward travel through a stem type zone of dense underwater obstacles.

FIG. 8 shows the combination device 10 of FIG. 7 in downward travel 31 through a stem type zone 33 of dense underwater obstacles, where weight 12 produces a pressure wave 32, pushing water and stems away from downward travel 31.

Figure 9:
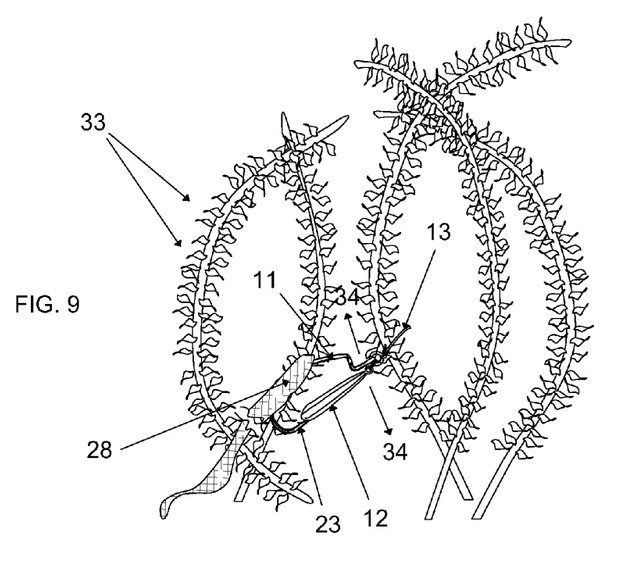
FIG. 9 is the combination device of FIG. 8 where line tension is initiated by a user to draw the combination device through said stem type zone.

FIG. 9 is the combination device 10 of FIG. 8 where line tension on fishing line 13 is initiated by a user to draw the combination device 10 through said stem type zone 33, producing a protective a pressure wave 34, pushing water and stems away from upward travel of device 10 in the direction of pull of fishing line 13.

Figure 10:
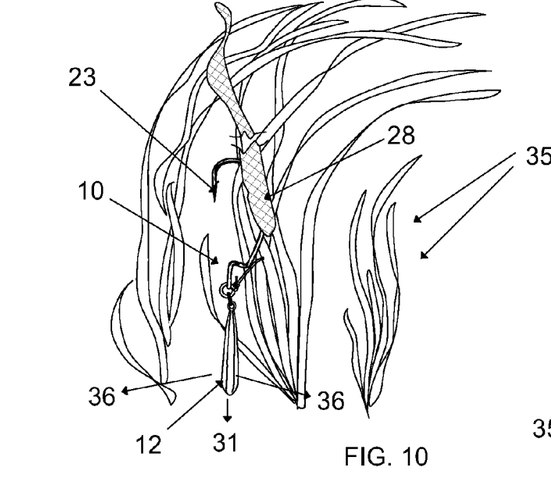
FIG. 10 shows the combination device of FIG. 7 in downward travel through a grass type zone of dense underwater obstacles.

FIG. 10 shows the combination device 10 of FIG. 7 in downward travel 31 through a grass type zone 33 of dense underwater obstacles, where weight 12 produces a pressure wave 36, pushing water and grass blades away from downward travel 31.

Figure 11:
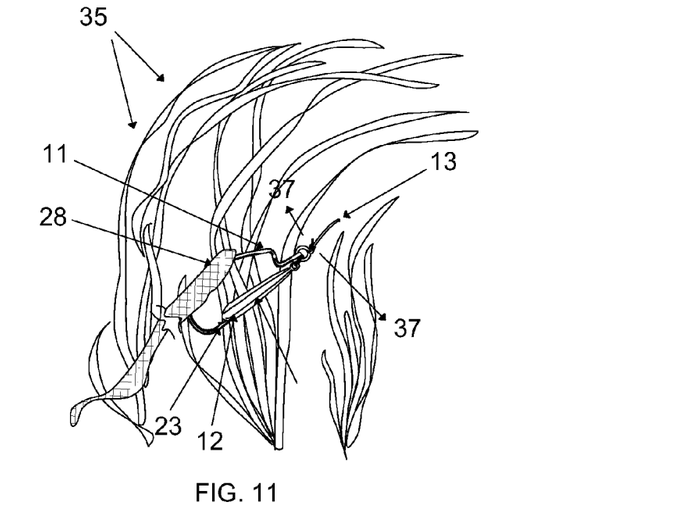
FIG. 11 is the combination device of FIG. 8 where line tension is initiated by a user to draw the combination device through said grass type zone.

FIG. 11 is the combination device 10 of FIG. 10 where line tension on fishing line 13 is initiated by a user to draw the combination device 10 through said grass type zone 35, producing a protective a pressure wave 37, pushing water and stems away from upward travel of device 10 in the direction of pull of fishing line 13.

In a preferred embodiment, downward travel velocity shall equal 3 inches per second before device 10 causes inversion of hook 11 and bait 28 as shown in FIG. 7. More preferably, downward travel velocity shall equal 6 inches per second before device 10 causes inversion of hook 11 and bait 28 as shown in FIG. 7. Weight 12 may optionally be oblong, round, square or diamond shaped.

Figures 12, 13, 14:
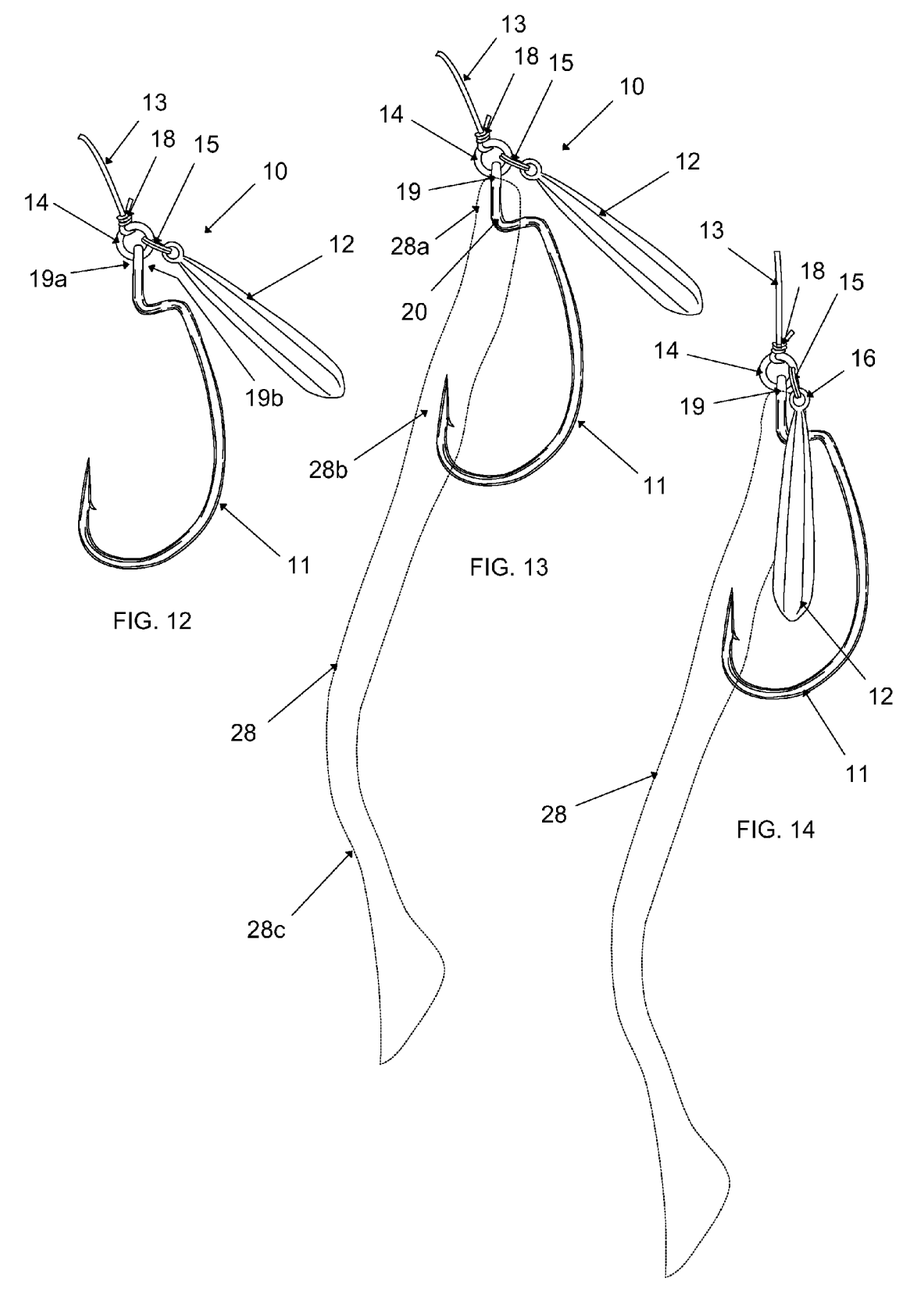
FIG. 12 shows side view of an alternate embodiment of the invention, where a fishing line is tied to a first ring connector between a hook point side of a hook eyelet and a second ring connector.
FIG. 13 shows the invention combination device of FIG. 12 with a soft bait shown in broken outline engaged to the hook, with a weight moved in a forward direction.
FIG. 14 shows the combination device of FIG. 13 as it would appear hanging from a fishing line.

FIG. 12 shows side view of an alternate embodiment of the invention combination device 10a, where a fishing line 13 is tied at knot 18 to a first ring connector 14 between a hook point side 19a of a hook eyelet 19 and a second ring connector 15. The effect of this connection imposes a beneficial orientation upon the entire combination device 10a, as further described below.

FIG. 13 shows the invention combination device of FIG. 12 with a soft bait 28 shown in broken outline engaged to the hook 11, where a head part is engaged with soft bait stay 20, a body part 28b is engaged with the hook point, and a tail part is allowed to flexibly trail below the hook 11, with a weight 12 moved in a forward direction for clarity. FIG. 14 shows the combination device of FIG. 13 as it would appear hanging from a fishing line 13. It will be appreciated that second ring connector 15, allowing weight 13 to move slightly out of the drawing page as shown, causes weight 12 to move axially generally close to that of hook for when fishing line 13 pulled in one direction is the primary force on the combination device. Alternately and less preferably, connector loop 16 may be expanded sufficiently to allow for its connection to the first ring connector 15 with elimination of second ring connector 15 while still obtaining some objects of the invention.

Figure 15:
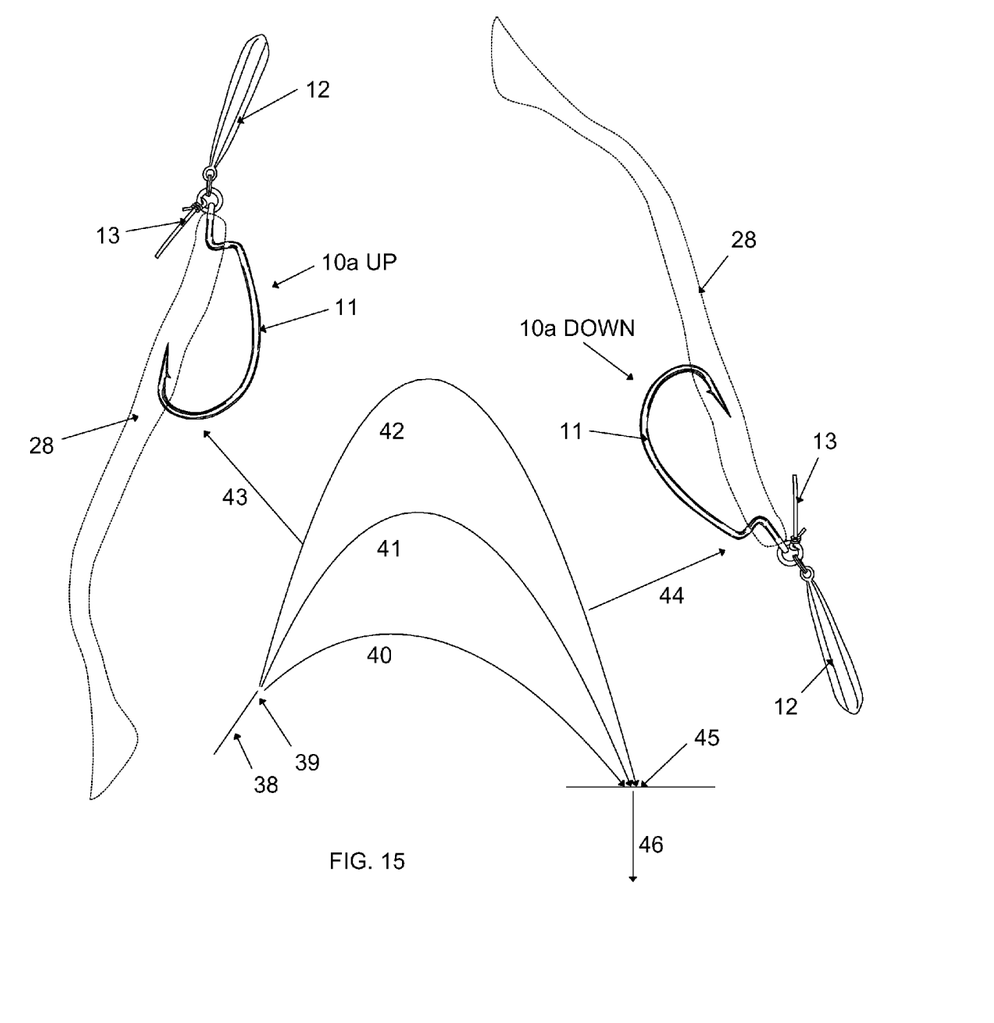
FIG. 15 shows a side view of three fishing rod casting arcs and the orientation of parts of the combination device of FIG. 13 at two points in a highest casting arc.

FIG. 15 shows a side view of three fishing rod casting arcs 40, 41, and 42 and the orientation of parts of the combination device of FIG. 13 at two points 43 and 44 in a highest casting arc 42. A representation of a fishing rod 38 comprises a rod end 39 from which the invention combination device would be cast to a water surface 45. Arcs 40 and 41 represent relatively shallow casting arcs, typically where underwater growth does not substantially extend from a bottom to the water surface. Where a substantial part of the water from a bottom toward a water surface 45 comprises underwater growth, it is critical that a cast hook assembly contact water surface 45 and immediately drop essentially vertically down along path 46. Arc 42 is a common one used to achieve an immediate downward path 46, as opposed to arcs 40 and 41. FIG. 15 shows the particular benefit of the invention combination device for casting along arc 42. At position 43, device 10a UP is shown with weight 12 extended upward in an upward part of arc 42, having the aerodynamic orientation of a missile for extended travel upward. Similarly, device 10a DOWN travels at relatively high speed toward water surface 45 from position 44, whereat it strikes water surface 45 with minimal splash, driving it with great penetrating force through surface layers of weeds or floating debris and down with the orientation shown in FIG. 16 into a body of water.

Figure 16:
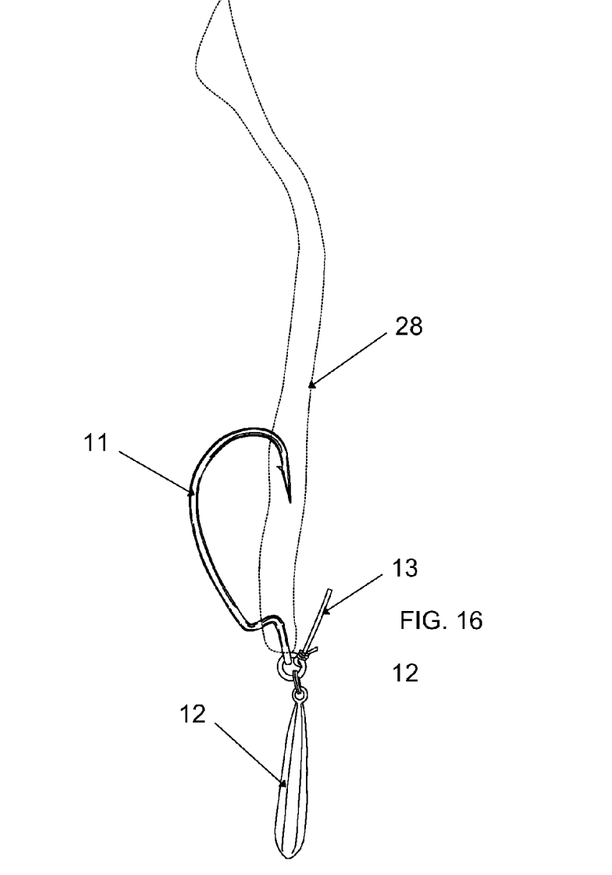
FIG. 16 shows the combination device of FIG. 13 as it would appear descending through water.
Figure 17:
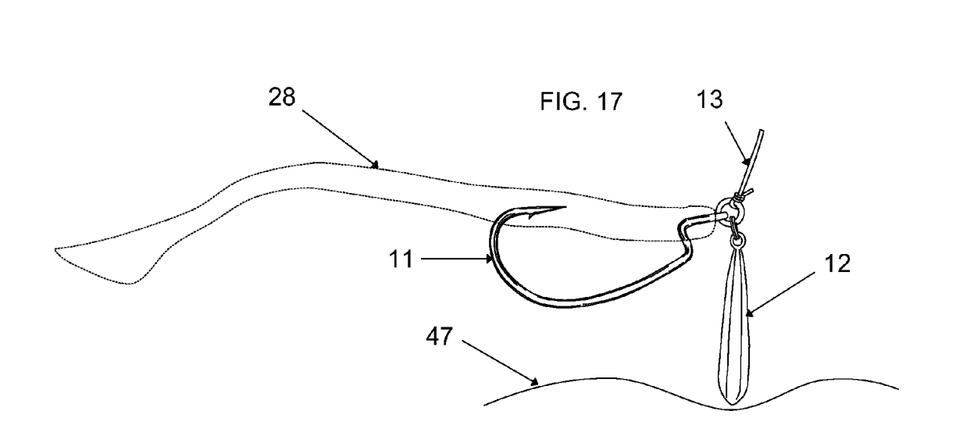
FIG. 17 shows the combination device of FIG. 13 as it would appear when a weight part touches a lake bottom.
Figure 18:
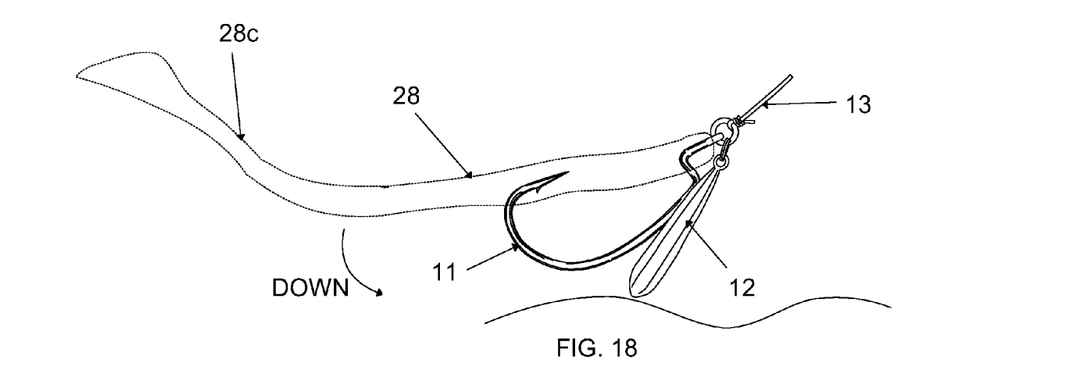
FIG. 18 shows the combination device of FIG. 13 as it would appear shortly after the orientation shown in FIG. 17.
Figure 19:
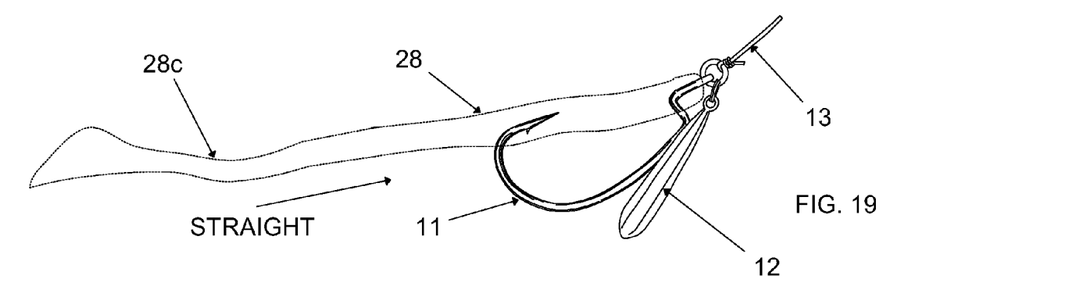
FIG. 19 shows the combination device of FIG. 13 as it would appear shortly after a fishing line is pulled in FIG. 18.

FIG. 17 shows the combination device of FIG. 13 as it would appear when a weight part touches down at a lake bottom 47 after the travel just described for FIG. 16. Hook 11 and soft bait 28 settle downward in a leftward arc away from upward vertical orientation, so that the hook point is directed upward and the hook shank is directed downward. As the device of FIG. 17 is allowed to settle further downward, it assumes the position shown in FIG. 18, where tail part 28c is lofted upward by the downward arc DOWN travel of hook 11 and soft bait 28. FIG. 19 shows the combination device of FIG. 18 as it would appear shortly after a fishing line 13 is pulled or jerked rightward, causing hook 11, soft bait 28 (including tail part 28c) and weight 12 to be drawn generally along an axis STRAIGHT. The change in fishing line tension from essentially none to substantial respectively in FIGS. 18 and 19 results in an undulating motion so that tail part 28c moves from an elevated to a straight position.

Figure 20:
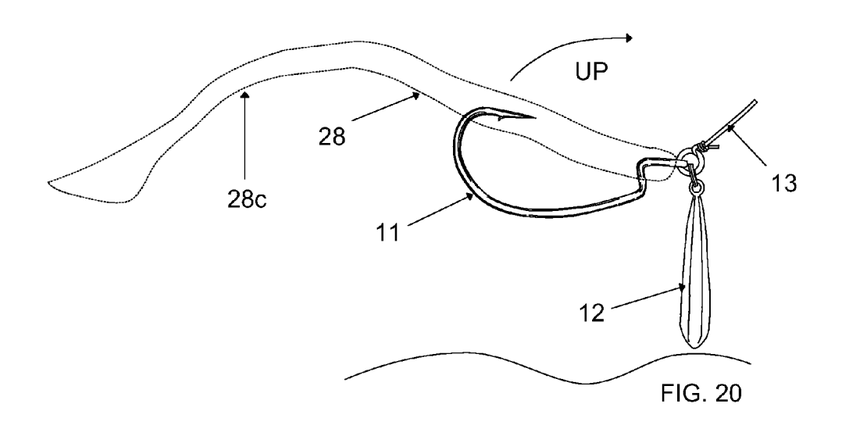
FIG. 20 shows the combination device of FIG. 13 as it would appear shortly after the fishing line of FIG. 19 is relaxed and a weight causes the combination device to sink downward.
Figure 21:
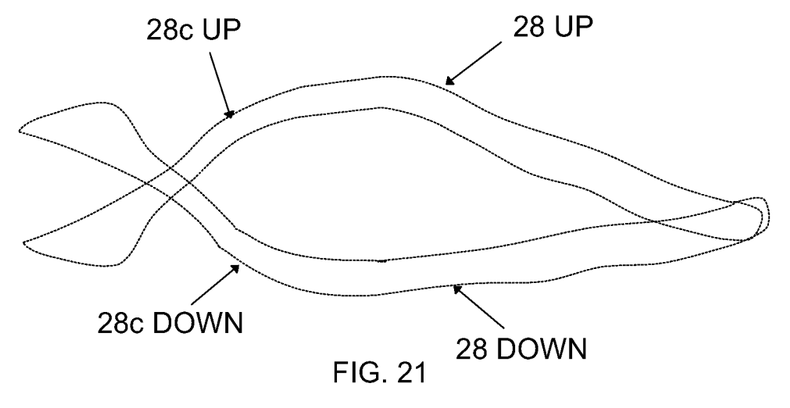
FIG. 21 shows alternate positions of the soft bait attached to the combination device in FIGS. 18 and 20 illustrating the sequential undulating movement achieved with use of the combination device.

FIG. 20 shows the combination device of FIG. 13 as it would appear shortly after the fishing line 13 of FIG. 19 is relaxed and weight 12 descend downward, instantly causing hook 11 and soft bait 28 to rise toward a vertical position along arc UP. If weight 12 is allowed to descend as little as a few inches, hook 11 and soft bait 28 (including tail part 28c) will resume the orientation of the parts of the combination device as shown in FIG. 16. The close coupling of the weight 12, hook 11 and fishing line 13 at a small central first ring connector creates the surprisingly responsive action of a soft bait fixed to the hook 11. FIG. 20 shows a fairly dramatic downward undulation of tail part 28c in response to the action just described. FIG. 21 shows alternate positions of the soft bait 28 UP and 28 DOWN respectively fixed to the combination device in FIGS. 18 and 20 illustrating the sequential undulating movement of tail parts 28c UP and 28c DOWN achieved with use of the combination device. This instant, responsive undulation is achieved in a small space and over a small distance as drawn to an angler by motion of their fishing rod. The effect of minimizing fish-attracting undulation of a soft bait means that snagging of underwater debris or growth is minimized and that more fish-attracting undulations are achieved per cast. Further, the motion of hook 11 through FIGS. 18, 19 and 20 is relatively minor up and down in a direction which has been partly cleared of debris or growth by the forward motion of fishing line 13 and weight 12, thereby (with the hook point protected by a soft bait) greatly reducing snagging of debris or underwater growth while leaving hook 11 properly oriented to hook a fish biting at soft bait 28.

The invention combination device will comprise a fishing hook comprising a top end, defining a hook eye, the top end extending down to a shank, a bend and then up to a hook point, said fishing hook defining a hook longitudinal length from the bottom of the bend to the top end and a hook point distance from the top end to the hook point; a first ring connector rotatably engaging the top end, a second ring connector and a fishing line directly connected with user line tension means; the second ring connector connected with a sinker weight, where the second ring connector and the sinker weight define a weight longitudinal length; and the weight longitudinal length is preferably from ten percent to two hundred percent of the hook longitudinal length, but more preferably from twenty percent to one hundred fifty percent of the hook longitudinal length.

The above design options will sometimes present the skilled designer with considerable and wide ranges from which to choose appropriate apparatus and method modifications for the above examples. However, the objects of the present invention will still be obtained by that skilled designer applying such design options in an appropriate manner.

I claim:

1. A combination device having a fishing hook and a sinker weight comprising:
   (a) the fishing hook comprising a top end, defining a hook eye and having a hook point side, the top end extending down to a shank, a bend and then up to a hook point, said fishing hook defining a hook longitudinal length from the bottom of the bend to the top end and a hook point distance from the top end to the hook point;
   (b) a first ring connector having a perimeter defining a single opening therein, the first ring connector rotatably directly engaging the top end through the hook eye, and also directly engaging a second ring connector and a fishing line, at least portions of the hook eye, the second ring connector and the fishing line extending through the single opening, the fishing line being also connected with a user line tension means, wherein the second ring connector connects to the first ring connector between a connection location of the fishing line to the first ring connector and a side of the top end opposite of the hook point side;
   (c) the second ring connector being further directly connected with a sinker weight via the second ring connector extending through a connector loop of the sinker weight, where the second ring connector and the sinker weight define a weight longitudinal length; and
   (d) the weight longitudinal length is from ten percent to one hundred fifty percent of the hook longitudinal length.

2. The device of claim 1 wherein the sinker weight is pendulum shaped.

3. The device of claim 1 wherein the sinker weight is oblong.

4. The device of claim 1 wherein the sinker weight is round, square or diamond shaped.

5. The device of claim 1 wherein the weight longitudinal length is from ten percent to one hundred ten percent of the hook longitudinal length.

6. The device of claim 5 wherein the weight longitudinal length is from thirty percent to ninety percent of the hook longitudinal length.

7. The device of claim 6 wherein the weight longitudinal length is from fifty percent to seventy percent of the hook longitudinal length.

8. The device of claim 1 wherein the weight longitudinal length is from about just greater than to just less than the hook point distance.

9. The device of claim 1 wherein a weight ratio of the fishing hook to the sinker weight is from 1:2 to 1:10.

10. The device of claim 1 further comprising a temporary bait fixed to the fishing hook.

11. The device of claim 10 wherein the temporary bait is a soft bait, a dough bait or a live bait.

12. The device of claim 11 wherein the weight and shape of the sinker weight is adapted so that, when said device is suspended in water from the fishing line and tension on the fishing line is released, said sinker weight descends with a bottom end downward and said fishing hook and temporary bait become oriented upward from their connection with the first ring connector.

13. The device of claim 12 wherein a minimum downward velocity of the sinker weight is 3 inches per second.

* * * * *